US005258782A

United States Patent [19]

Ochiai

[11] Patent Number: 5,258,782

[45] Date of Patent: Nov. 2, 1993

[54] DEVICE FOR REMOVING CHARGE FROM A DIELECTRIC MEMBER IN AN IMAGE FORMING APPARATUS

[75] Inventor: Toshihiko Ochiai, Tokyo, Japan

[73] Assignee: Canon Kabushiki Kaisha, Tokyo, Japan

[21] Appl. No.: 868,864

[22] Filed: Apr. 16, 1992

[30] Foreign Application Priority Data

Apr. 26, 1991 [JP] Japan .......................... 3-097250

[51] Int. Cl.⁵ .......................... G01D 15/06

[52] U.S. Cl. .......................... 346/153.1; 346/159; 355/296; 355/303; 118/652

[58] Field of Search .......................... 346/159, 154, 153.1; 355/296, 297, 303, 305; 118/652

[56] References Cited

U.S. PATENT DOCUMENTS

| | | | |
|---|---|---|---|
| 3,739,748 | 6/1973 | Rittler et al. | 118/637 |
| 3,914,771 | 10/1975 | Lunde et al. | 346/74 ES |
| 4,259,003 | 3/1981 | Managal et al. | 355/296 |
| 4,290,076 | 9/1981 | McFarland | 346/154 |
| 4,763,168 | 8/1988 | Lindblad | 355/296 |
| 4,788,564 | 11/1988 | Ochiai | 346/153.1 |
| 4,885,223 | 12/1989 | Enoki et al. | 118/652 X |
| 4,887,103 | 12/1989 | Imai et al. | 346/160.1 |
| 4,910,538 | 3/1990 | Ochiai et al. | 346/162 |
| 4,989,021 | 1/1991 | Ochiai et al. | 346/160.1 |
| 5,003,327 | 3/1991 | Theodoulou et al. | 346/154 |
| 5,053,827 | 10/1991 | Tompkins et al. | 355/271 |
| 5,077,566 | 12/1991 | Ochiai et al. | 346/153.1 |
| 5,119,144 | 6/1992 | Hada et al. | 355/303 |
| 5,132,869 | 7/1992 | Nakaya et al. | 355/296 X |

FOREIGN PATENT DOCUMENTS 51-46707 12/1976 Japan .

*Primary Examiner*—George H. Miller, Jr.
*Assistant Examiner*—R. Gibson
*Attorney, Agent, or Firm*—Fitzpatrick, Cella, Harper & Scinto

[57] ABSTRACT

A device is provided which is capable of removing the charge of a recording medium, even a low charge. The recording medium has an electrically-conductive layer and dielectric layers, and is used for forming a toner image by an image forming apparatus. The device includes a first charge-removing electrode in contact with the electrically-conductive layer of the recording medium and a second charge-removing electrode which is in contact with the dielectric layer of the recording medium and is positioned on a side of the recording medium which is opposite to the side of the first charge-removing electrode. A voltage with the same polarity as that remaining on the surface of the dielectric layer of the recording medium is applied to the first charge-removing electrode, and a voltage with a polarity opposite to that remaining on the surface of the dielectric layer is applied to the second charge-removing electrode.

18 Claims, 8 Drawing Sheets

DEVICE FOR REMOVING CHARGE FROM A DIELECTRIC MEMBER IN AN IMAGE FORMING APPARATUS

BACKGROUND OF THE INVENTION

1. Field of the Invention

The present invention relates to an image forming apparatus using a dielectric member and, more particularly, to a technique of removing a charge from the dielectric member, and to an image forming apparatus to which such a technique is applied.

2. Description of the Related Art

A known image forming apparatus employing a dielectric member and a charge-removing technique, provides electrical conductivity between the dielectric member and a recording electrode. A signal voltage is applied to the recording electrode to form a toner image on the dielectric member. Such an apparatus is disclosed in, for example, Japanese Examined Patent Publication No. 51-46707 and corresponding U.S. Pat. No. 3,914,771. As shown in FIG. 12, a magnetic, electrically-conductive toner 1 is transferred by a rotary magnet 2 onto a non-magnetic cylinder 3, made of, for example, stainless steel, and passed onto a recording electrode 4 made of a magnetic material. A voltage is applied between the recording electrode 4 and an electrically-conductive layer 7 of a recording medium M. The recording medium M has an insulating layer 6 formed on the surface thereof, which surface constitutes the dielectric member. A charge is thus induced to the toner which electrostatically adheres to the recording medium M, whereby an image is formed.

There has been proposed an image forming device to which the recording technique mentioned above is applied, and in which the above mentioned recording electrode is utilized. FIG. 11 shows the entire structure of such a display device. In this Figure, numeral 1 denotes electrically-conductive toner; 4, a recording electrode; M, a recording medium; 8, a brush-like cleaning member; 9, a magnet; 10, a toner container; 11, a member for supporting the recording medium; 12, a main frame; and 13, a record control section. The electrically-conductive toner 1 adheres or does not adhere to the recording medium M in accordance with a signal voltage applied from the recording electrode 4. Thereby, a toner image is formed on the recording medium M. For example, when a signal voltage of +40 V is applied from the record control section 13, the toner adheres to the recording medium M, whereas when no voltage is applied, the toner does not adhere, thus forming the toner image on the recording medium M.

The toner image which has been formed on the recording medium M is displayed, and then scraped by the brush-like cleaning member 8, and thus removed from the recording medium M. Conventionally, during the above-described operation a predetermined voltage ranging from −3 to −5 V is applied to a brush 8' of the cleaning member 8. Furthermore, there has been proposed a humidity sensor which measures the amount of environmental moisture. A voltage is applied to the cleaning member 8 according to the amount of environmental moisture. These inventions are disclosed in U.S. Pat. Nos. 4,788,564; 4,887,103; 4,989,021; 4,910,538; 5,077,566; and patent application Ser. No. 545,645 (filed on Jun. 29, 1990) now U.S. Pat. No. 5,089,832 issued Feb. 18, 1992.

In the above-noted known arrangements, as the cleaning member scrapes and collects the residual toner, it generates friction while sliding on the recording medium. In addition, a charge-removing member in contact with an electrically-conductive member of the recording medium removes the charge of the dielectric member while the charge-removing member is in contact with an electrically-conductive material, such as a brush or a rubber roller. One disadvantage to the known arrangements is that when the cleaning member slides on the recording medium and friction is produced, a charge is generated on the recording medium because of a frictional static build-up. As a result, when the recording medium passes a recording portion, the toner adheres to the charge generated during cleaning, thereby contaminating the recording medium.

Another disadvantage to the known arrangements is that a charge, which is opposite to the charge generated by friction while the cleaning member slides on the recording medium, is induced and generated inside the recording medium. If the area where the charge-removing member is in contact with the electrically-conductive member is small, the induced charge and the charge generated inside the recording medium during recording cannot be removed completely. Therefore, a previously-recorded image is partially developed and produced on the recording medium, i.e., a so-called ghost image is produced.

To improve the efficiency with which a charge is removed, it is possible to employ both a method for increasing the area where the charge-removing member is in contact with the electrically-conductive member of the recording medium, and a method for forcibly pressing the charge removing member against the electrically-conductive member of the recording medium. In these methods, however, while the recording medium is being driven, its load is increased because of the friction and pressing force. As a result, the capacity of the driving motor for transferring the recording medium must be increased, thus increasing operational noise and power consumption.

There are two problems with the method in which the humidity sensor measures moisture and a voltage is accordingly applied to the cleaning member. First, the humidity sensor may respond inaccurately. Second, the amount of voltage to be applied to the cleaning member is uniformly determined regardless of the electrical resistance of the surface of the recording medium. Thus an inappropriate amount of voltage may be applied.

SUMMARY OF THE INVENTION

The present invention solves the problems of the charge-removing technique mentioned above. The object of this invention is to provide a technique for effectively removing the charge of a dielectric member which solves the problems specific to the dielectric member.

The invention in one aspect pertains to a device for removing a charge from a recording medium used for forming a toner image in an image forming apparatus, the recording medium having an electrically-conductive layer and a dielectric layer. The device comprises a means for forming the toner image on the recording medium; a first charge-removing electrode assembly in contact with the electrically-conductive layer of the recording medium; a means for applying a voltage a polarity the same as that remaining on a surface of the dielectric layer of the recording medium to said first charge-removing electrode assembly; a second charge-removing electrode assembly, which is in contact with the dielectric layer of the recording medium, and is positioned on a side of the recording medium which is opposite to a side of said first charge-removing electrode assembly; and a means for applying a voltage with a polarity opposite to that remaining on the surface of the dielectric layer of the recording medium to said second charge-removing electrode assembly, where the charge of said recording medium is removed after the toner image has been utilized.

The invention in another aspect pertains to a device for removing a charge from a recording medium used for forming a toner image in an image forming apparatus, the recording medium having an electrically-conductive layer. The device comprises a plurality of recording electrodes that are independent of each other the recording medium being movable and facing said plurality of recording electrodes; magnetic field generating means for supplying a magnetic, electrically-conductive toner between the plurality of recording electrodes and the recording medium; a first charge-removing electrode assembly in contact with the electrically-conductive layer of the recording medium; a means for applying a voltage with a polarity the same as that remaining on a surface of the dielectric layer of the recording medium to said first charge-removing electrode assembly; a second charge-removing electrode assembly which is in contact with the dielectric layer of the recording medium and is positioned on a side of the recording medium which is opposite to a side of said first charge-removing electrode; and a means for applying a voltage with a polarity opposite to that remaining on the surface of the dielectric layer of the recording medium to said second charge-removing electrode assembly, where the charge of said recording medium is removed after the toner image has been utilized.

Figure 7:
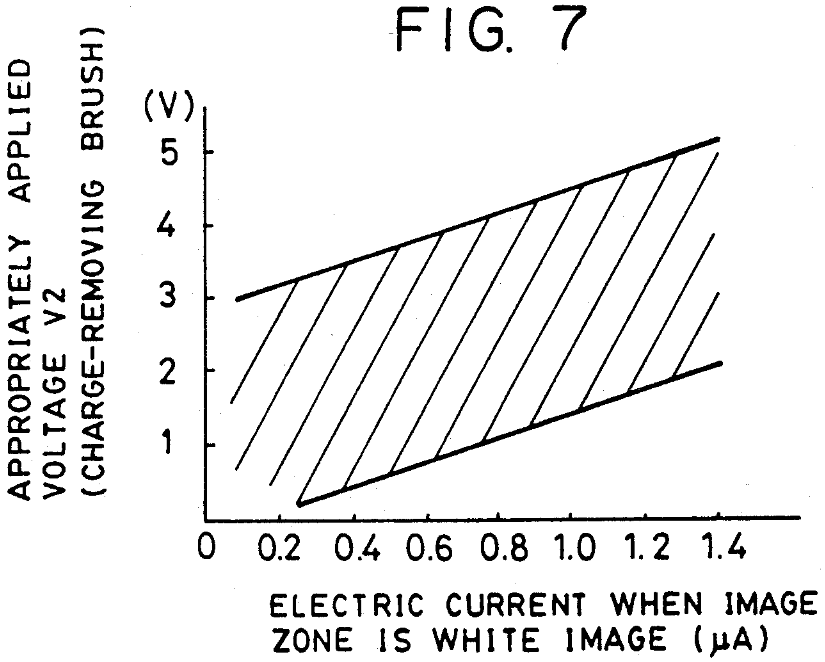
Figure 8:
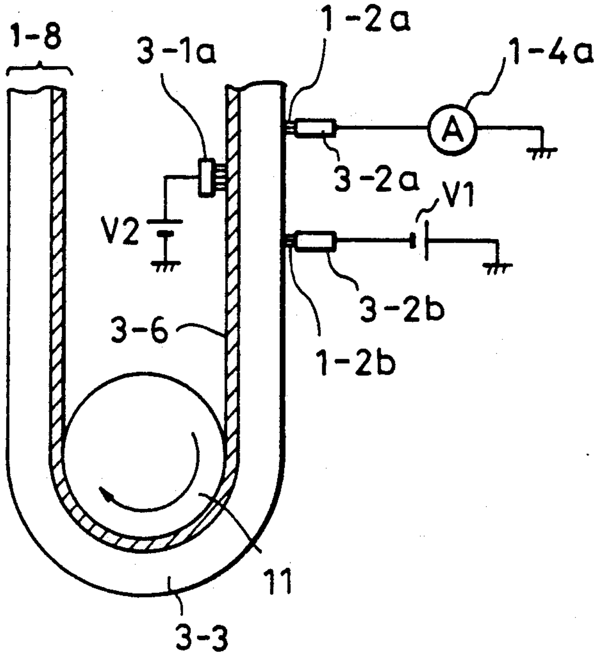
Figure 9:
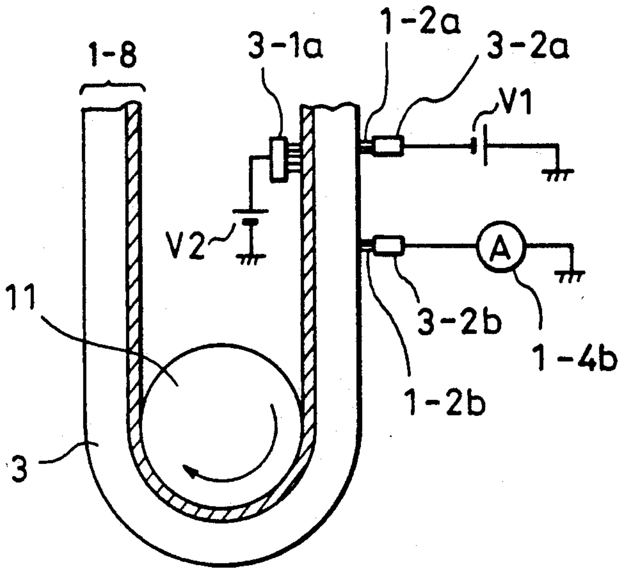
Figure 10:
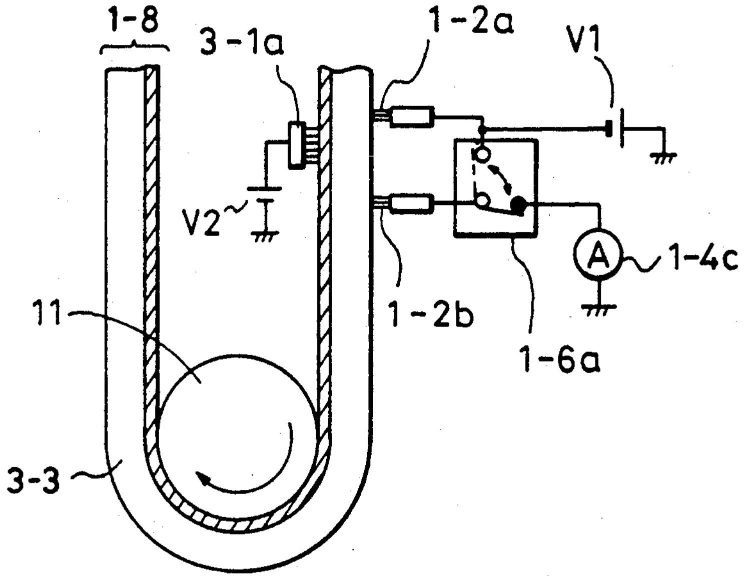
Figure 11:
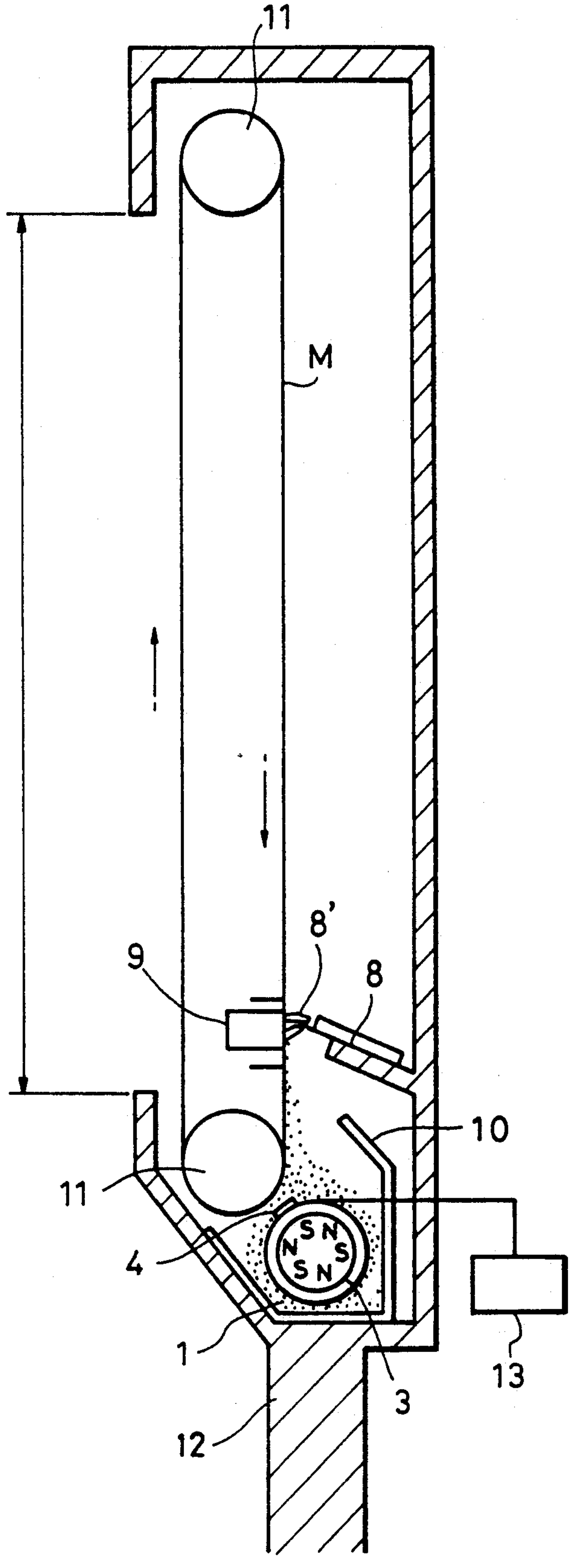
FIG. 11 PRIOR ART
Figure 12:
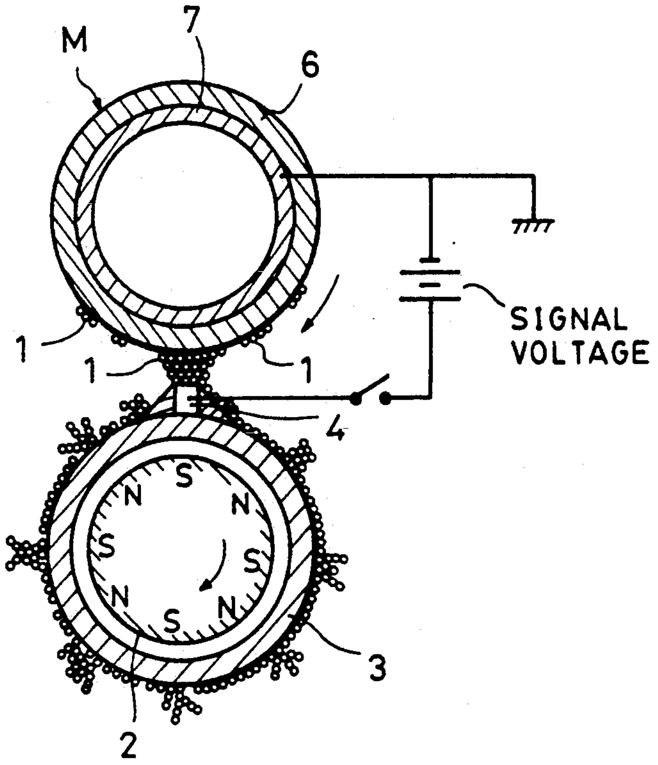
FIG. 12 PRIOR ART

FIG. is a graph showing the range within which an appropriate voltage $V_1$ is applied to a cleaning brush;

FIG. 7 is a graph showing the range within which an appropriate voltage $V_2$ is applied to a charge-removing brush;

FIG. 8 is a view schematically illustrating another embodiment of the invention;

FIG. 9 is a view schematically illustrating a further embodiment of the invention;

FIG. 10 is a view schematically illustrating another embodiment of the invention;

FIG. 11 is a sectional view illustrating a known conventional image forming device; and FIG. 12 is a view illustrating the principle according to which images are formed by the device shown in FIG. 11.

DESCRIPTION OF THE PREFERRED EMBODIMENTS

Figure 1:
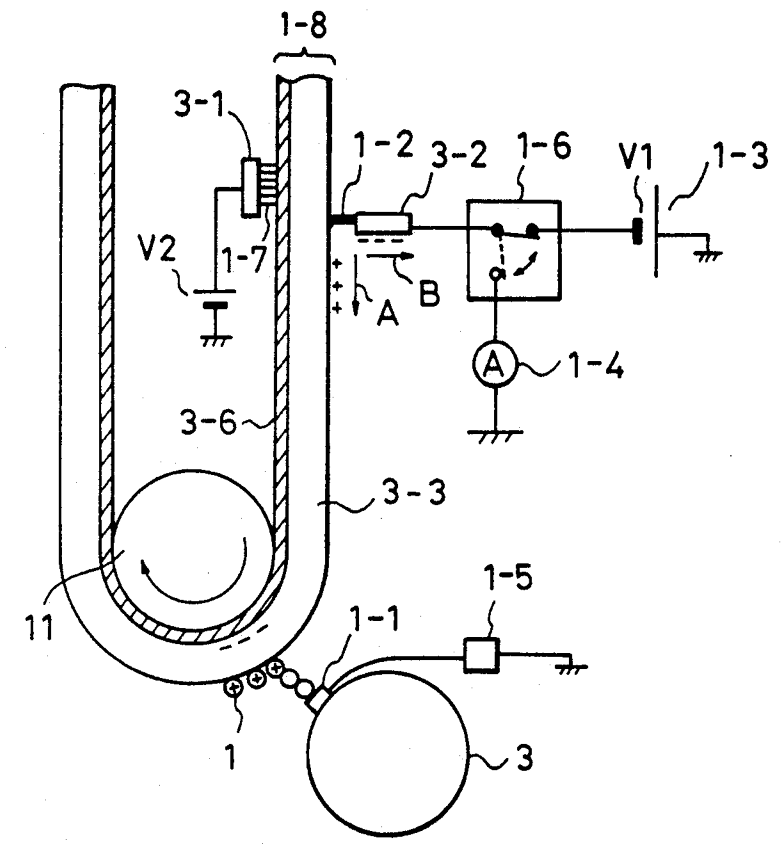
FIG. 1 is a view schematically illustrating an embodiment of the present invention.
Figure 2:
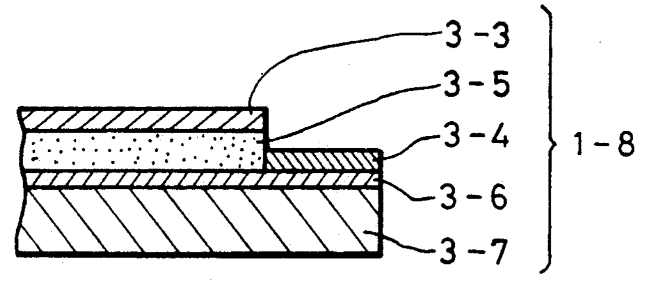
FIG. 2 is a sectional view of a dielectric member used in the first embodiment.
Figure 3:
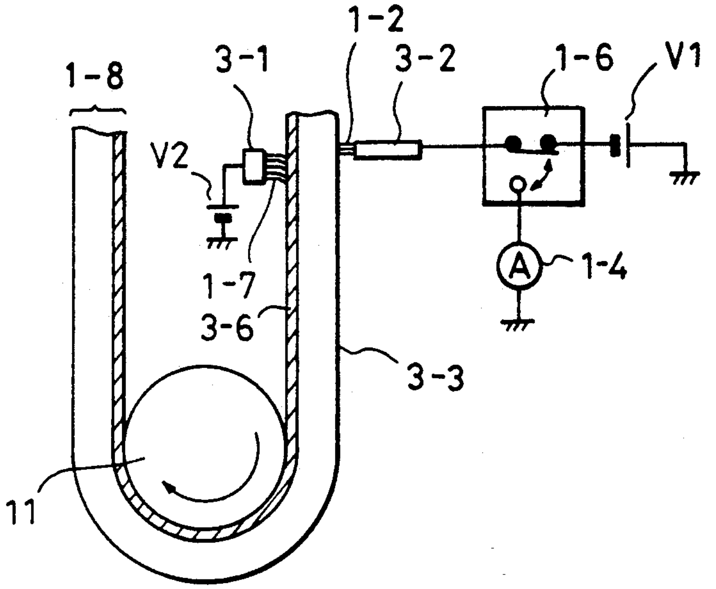
FIG. 3 is a view schematically illustrating another embodiment of the invention.
Figure 4:
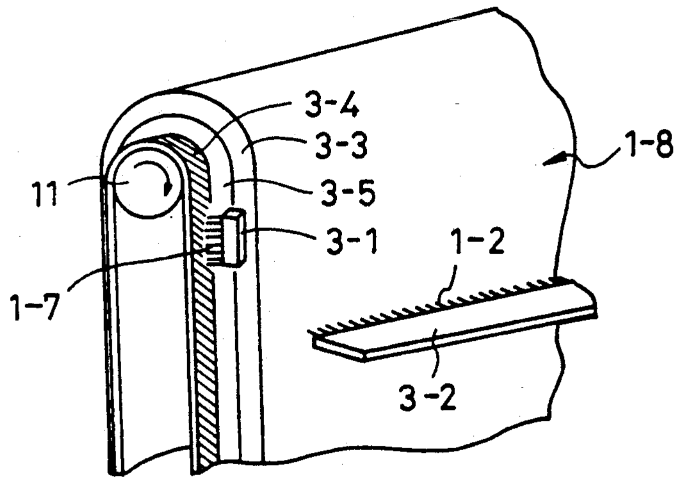
FIG. 4 is a partial perspective view showing the arrangement of first and second sliding electrodes in the embodiment.

FIG. 1 is a view schematically illustrating a first embodiment of the present invention, and FIG. 2 is a sectional view of a recording member 1-8 used in the first embodiment. FIG. 4 is a view showing the arrangement of a charge-removing member 3-1 for removing charge and a member 3-2 for removing an unnecessary toner image formed on the recording medium 1-8.

The recording medium 1-8 is formed as shown in FIG. 2. Aluminum is vapor-deposited on a polyethylene terephthalate (plastic resin) sheet 3-7 having a thickness of 100 to 200 μm. A white layer 3-5 having a thickness of 5 to 30 μm is formed on an aluminum-deposited layer 3-6. The white layer 3-5 is formed in the following manner. A substance, such as titanium oxide ($TiO_4$) or aluminum oxide ($Al_2O_3$), is mixed with a binder like plastic resin. The mixed substance is dissolved in an organic solvent, such as a ketone solvent, an alcohol solvent, or trichlene, then applied to the aluminum deposited layer 3-6, and dried. A dielectric layer 3-3, which has a thickness of 1 to 10 μm and is made of a transparent or white plastic resin, is formed on the white layer 3-5.

The aluminum deposited (Al vapor deposition) dielectric layer 3-6 is an electrically-conductive layer to which a carbon paste layer 3-4 having excellent electrical conductivity is applied to reduce resistance due to wear. Such wear is caused when the charge-removing member 3-1 slides on the recording medium 1-8.

In this embodiment, the charge-removing member 3-1 and the removing member 3-2, respectively forming first and second sliding electrodes, have carbon fibers forming cleaning brushes 1-7 and 1-2, respectively, clamped by metal plates, and are arranged as shown in FIG. 4.

Figure 5:
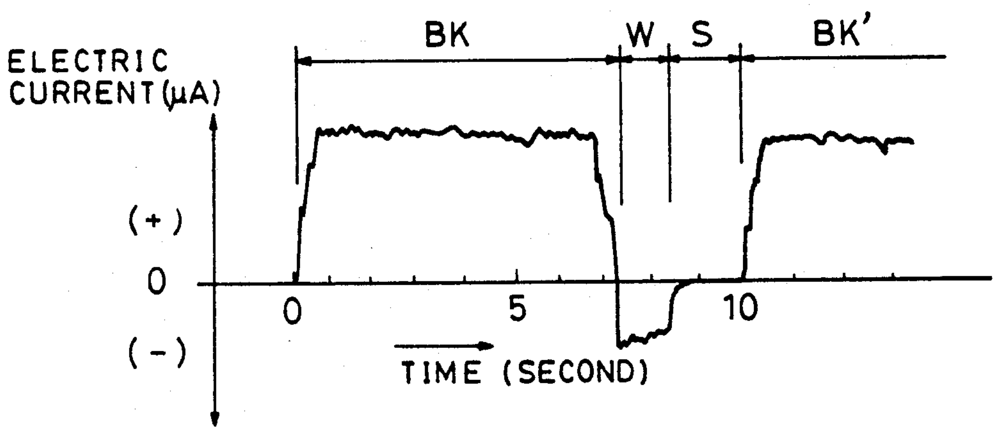
FIG. 5 is a graph showing the characteristics of a detecting electric current.

As illustrated in FIG. 1, while the recording medium moves clockwise as indicated by the arrow, a positive charge is generated because of the friction caused by the removing member 3-2, which is the second sliding electrode, when it slides on the recording medium 1-8. As the recording medium 1-8 moves, a positive charge flows in a direction indicated by A, and a negative charge, which is generated simultaneously with the positive charge, flows in a direction indicated by B. The amount of the negative charge flowing in direction B is measured, and the negative charge can be accordingly impregnated into the recording medium 1-8 so as to offset the positive charge on the recording medium 1-8. When a cleaning brush 1-2 of removing member 3-2 is grounded and when all image zones are black (a recording voltage being rated at 30 V) and the space between the image zones is absolutely white, an electric current flowing in direction B is shown in FIG. 5. In other words, since recording is performed positively, the toner maintains a positive charge which flows in direction B as the cleaning brush 1-2 slides frictionally. Such a positive charge assumes a value shown in region BK of FIG. 5. When the space between the image zones is white, a negative charge flows in direction B of FIG. 1, and assumes a value shown in region W of FIG. 5. After one screen has been displayed, the recording medium 1-8 stops, and the electric current becomes a zero value as shown in region S of FIG. 5. Zone BK′ indicates the electric current for the next black image zone.

Figure 6:
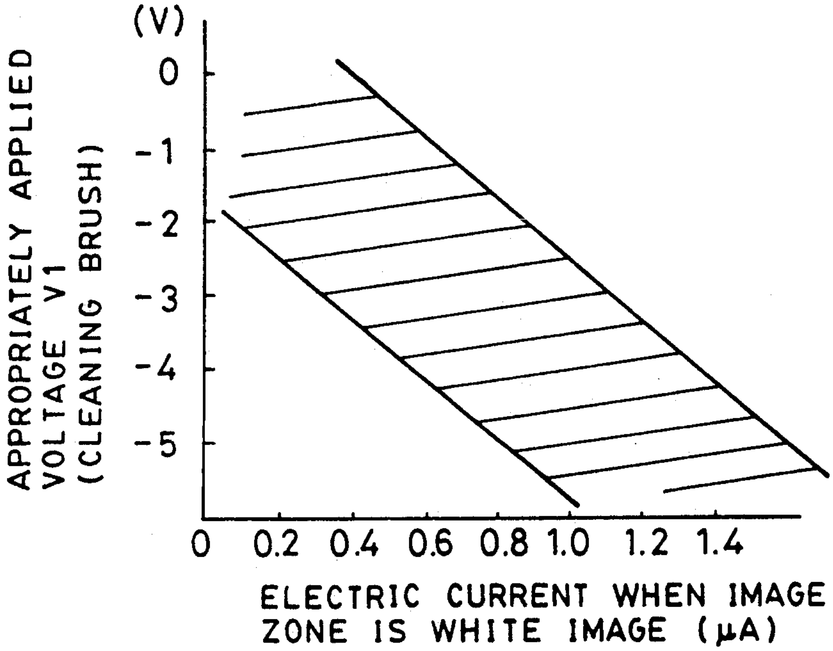

The image zones of the recording medium 1-8 are not always entirely black. At least while the cleaning brush 1-2 slides frictionally between the image zones, a predetermined voltage is required. This voltage is determined by measuring the electric current flowing in direction B when the cleaning brush 1-2 is grounded as it slides frictionally between the image zones (see zone W in FIG. 5). FIG. 6 shows the relationship between the electric current when the image zone is white and a voltage $V_1$, which has to be applied from a power supply to the cleaning brush 1-2. The voltage is applied to the cleaning brush 1-2 so as to fall within the hatched portion of FIG. 6. A switch 1-6 (FIG. 1) may be actuated to measure the electric current between the image zones for each screen, or it may be actuated for a plurality of screens.

With reference to FIG. 1, a description will now be given of a voltage applied to the cleaning brush 1-7 of the charge-removing member 3-1 forming the first sliding electrode. A positive charge is accumulated on the surface of the recording medium 1-8, whereas a negative charge, corresponding to the positive charge, is accumulated inside the recording medium 1-8. There are two reasons for this phenomenon. The first reason is that, in this embodiment, a positive voltage of 30 V is applied to a recording electrode to perform recording, and thus the negative charge is induced inside the recording medium 1-8 (in a portion of the medium, like the dielectric layer, having a high electrical resistance). In some cases, the negative charge may remain inside the dielectric layer of the recording medium 1-8, even after a toner, having the positive charge of the surface of the recording medium 1-8, has been brushed and removed by the cleaning brush 1-2.

The second reason is that, when the space between the image zones is white, the cleaning brush 1-2 slides frictionally on the surface of the recording medium 1-8. As a result, a positive charge is generated on the surface of the recording medium 1-8. When this happens, a polarity opposite to the positive charge, i.e., a negative charge, is induced and accumulated inside the dielectric layer 3—3 of the recording medium 1-8.

For these two reasons, a negative charge is accumulated inside a certain portion of the recording medium 1-8. For example, if a charge corresponding to $-5$ V is accumulated, a potential difference of 35 V is produced between the recording medium 1-8 and the recording electrode 1—1, even when the negatively-charged portion is recorded at $+30$ V. Since a portion around the negatively-charged portion is recorded at 30 V, a large amount of the toner adheres to only the negatively-charged portion, thereby producing a high-density image or a so-called ghost image. A positive charge is forcibly applied to the charge-removing member 3-1 in order to offset the negative charge accumulated inside the recording medium 1-8. A voltage $V_2$ required for such an operation is applied from a power supply, and is determined, in the same manner as described previously, by measuring the electric current flowing in direction B when the space between the image zones is white. FIG. 7 shows the relationship between the electric current and the voltage $V_2$. The ordinate axis indicates the voltage $V_2$ applied from the power supply, while the abscissa axis indicates the electric current flowing in direction B. The hatched portion of FIG. 7 is an appropriate range within which the voltage $V_2$ is applied.

As described above, the electric current flowing when the space between the image zones is white is measured by the electrode serving as the charge-removing member 3-1. A predetermined voltage is applied to the cleaning brush 1-2 of the charge-removing member 3-1 so that a negative charge can flow to the surface of the recording medium 1-8. Another predetermined voltage is applied to the brush 1-7 of the charge-removing member 3-1 so that a positive charge can flow into the recording medium 1-8. Because of the above, a charge does not remain on the surface of the recording medium 1-8 or inside the recording medium 1-8 during the cleaning and recording operations. As a result, fogging and a ghost image due to the undesirable charge are not produced, and instead, a clear, high-quality image is produced.

FIG. 8 shows a second embodiment of this invention, which is developed from the first embodiment. A plurality of cleaning members 3-2*a* and 3-2*b* (having brushes 1-2*a* and 1-2*b*, respectively) are employed to separate the function of each cleaning member, allowing each cleaning to have a function brush. An cleaning member 3-2*a* is always grounded. The electric current is measured by a current detector or element 1-4*a*.

In the same manner as that mentioned previously, the electric current is measured when the space between image zones (or not necessarily between image zones in this embodiment) is white, and a negative voltage is applied as much as required to a lower cleaning member 3-2*b*. FIG. 6 shows the relationship between the electric current and the voltage at this phase. The negative voltage is applied to fall within the hatched portion of FIG. 6. A charge-removing member 3-1*a* functions and operates in the same way as the charge-removing member 3-1 in the first embodiment. A bias which is always required for the entire surface of a recording medium 1-8 can be applied to the cleaning member 3-2*b*. This is the greatest advantage of the embodiment shown in FIG. 8. In the first embodiment shown in FIG. 1, a region where or a time period when the required voltage is not applied, because the voltage is used for measuring the electric current, may be produced between image zones. For this reason, there is a danger that during such a time period the toner may adhere in a belt-like fashion to the recording medium with which the cleaning member comes into contact.

In this embodiment, however, it is not always necessary to continue to apply the voltage to the cleaning and charge-removing members while the recording medium 1-8 is stopped.

As shown in FIG. 9, two cleaning members 3-2*a* and 3-2*b* also may be employed. A predetermined voltage is applied to the upper cleaning member 3-2*a*. The lower cleaning member 3-2*a* measures the electric current of a white image zone. In the embodiments shown in FIGS. 8 and 9, the upper and lower cleaning members are inverted. In this embodiment, the electric current of the surface of a recording medium 1-8 can be measured more accurately than in the other embodiments. The reason for this is that the upper brush 1-2*a* first slides frictionally on the medium 1-8. Therefore, the toner on the medium 1-8 has little effect and there is a small variation in the electric current measured. It is thus possible to apply the appropriate voltages from the power supplies to the upper cleaning brush 1-2*a* and the charge-removing member 3-1*a*.

Two cleaning members are also employed in another embodiment shown in FIG. 10. A predetermined negative voltage is applied to the cleaning brushes 1-2*a* and 1-2*b*. A switch 1-6*a* may be actuated to apply or not to apply the negative voltage to the lower brush 1-2*b* so that the electric current flowing in a white space between image zones can be measured, so that the electric current of the white image zone on the medium 1-8 can flow to the ground side, and so that the voltage can assume a zero value.

In this embodiment as shown in FIGS. 1 and 2, when a voltage to be applied to a recording electrode 1—1 is negative and when the charge to be generated on the surface of the recording medium 1-8 is also negative because of the friction caused by the brush 1-2 of the cleaning member 3-2 sliding on the medium 1-8, the voltage and the negative charge assume the opposite polarity. In other words, the cleaning member 3-2 induces a positive charge into the surface of the recording medium 1-8, and a charge-removing member 3-1 induces a negative charge into a dielectric layer 3—3 of the recording medium 1-8. Thus, a clear, high quality image can be obtained in the same manner as in the other embodiments.

As has been described above, since a positive charge is generated on the surface 3—3 of the recording medium 1-8, the electrically-conductive cleaning member, which is the second electrode, forcibly induces a negative charge. Also, since a negative charge is generated inside the recording medium 1-8, the charge-removing brush, which is the first electrode, forcibly induces a positive charge. Because of such an induced charge, during the recording and the cleaning operations, an unnecessary charge is not accumulated on the surface or inside the recording medium 1-8. As a result, unnecessary developing powder does not adhere to the medium. A clear, high-quality image can thus be produced. Furthermore, according to the method described in the above-described embodiments, the charge of the dielectric is detected, and a bias for removing the charge is determined on the basis of the result of the detection. It is therefore always possible to produce a high-quality image regardless of the frequency with which the device is used and of environmental factors, such as temperature and humidity.

An image forming apparatus using a magnet-stylus recording system, and a recording medium, used as a dielectric, on which a toner image is formed by such a recording system have been described in the above embodiments.

However, a recording medium may also be employed in which a stylus-like recording electrode forms an electrostatic image that is developed by the toner. Alternatively, a recording medium may be employed in which ions are generated or modulated by modulating means and developed into an image.

In addition to the above recording media, a recording medium may also be employed in which a charged toner image is formed while a sheet having a dielectric layer formed on the surface thereof is absorbed and transferred.

This invention enables first and second sliding electrodes, using as electrically-conductive brushes, blades or rollers, to completely remove the charge from a dielectric because even a charge generated inside the dielectric is offset Thus, even an apparatus for forming an image using a low charge is capable of producing a high-quality image since no ghost image due to incomplete offset of the charge is produced. Moreover, the disclosed invention is capable of efficiently offsetting the charge, and of making the sliding electrodes small, thus making it possible to increase the speed at which an image is formed and making an image forming apparatus small. The disclosed invention can be effectively applied to image forming apparatuses, particularly to those in which a toner image is formed using a low electric potential ranging from 10 to 60 V, and more specifically, from 15 to 30 V, as described herein.

The toner used in the above-described embodiments has a volume resistivity ranging from $10^3$ to $10^9$ Ωcm and a particle diameter ranging from 8 to 15 μm, preferably, 10 to 15 μm. It is made of 1–10 wt % carbon, 40–70 wt % ferrite, and the balance is plastic resin, such as acrylic resin, nylon resin, polyethylene, or polypropylene.

While the present invention has been described with respect to what is presently considered to be the preferred embodiments, it is to be understood that the invention is intended to cover various modifications and equivalent arrangements included within the sphere and scope of the appended claims. The scope of the following claims is to be accorded the broadest interpretation so as to encompass all such modifications and equivalent structures and functions.

What is claimed is:

1. A device for removing a charge from a recording medium used for forming a toner image in an image forming apparatus, the recording medium having an electrically-conductive layer and a dielectric layer, said device comprising:

means for forming the toner image on the recording medium;

a first charge-removing electrode assembly in contact with the electrically-conductive layer of the recording medium;

means for applying a voltage having a polarity the same as that of a charge remaining on a surface of the dielectric layer of the recording medium to said first charge-removing electrode assembly;

a second charge-removing electrode assembly, which is in contact with the dielectric layer of the recording medium, and is positioned on a side of the recording medium; and means for applying a voltage with a polarity opposite to that of the charge remaining on the surface of the dielectric layer of the recording medium to said second charge-removing electrode assembly, wherein the magnitudes of the voltages applied to the first and second electrode assemblies are determined so that the charge within said recording medium is removed after the toner image has been utilized.

2. A device according to claim 1, wherein said second charge-removing electrode assembly comprises a brush and serves to remove residual toner.

3. A device according to claim 1, wherein said second charge-removing electrode assembly comprises a roller and serves to remove residual toner.

4. A device according to claim 1, further comprising means for detecting an electric potential remaining on the dielectric layer of the recording medium, wherein the voltage to be applied to said second charge-removing electrode assembly is determined on the basis of a result of the detected potential

5. A device according to claim 4, wherein said second charge-removing electrode assembly comprises a first electrode for detecting an electric potential remaining on the dielectric layer of the recording medium positioned upstream of a direction in which the recording medium is moved, and a second electrode positioned downstream of said first electrode, wherein a voltage with a polarity opposite to that remaining on the dielectric layer of the recording medium is applied to said second electrode on the basis of a result of the detected electric potential.

6. A device according to claim 4, wherein said second charge-removing electrode assembly comprises a first electrode to which is applied a voltage having a polarity opposite to that remaining on the surface of the dielectric layer of the recording medium positioned upstream of the direction in which the recording medium is moved, and a second electrode for detecting the electric potential remaining on the recording medium, said second electrode being positioned downstream of said first electrode.

7. A device according to claim 1, wherein said second charge-removing electrode assembly comprises a first electrode for detecting an electric potential remaining on the dielectric layer of the recording medium positioned upstream of a direction in which the recording medium is moved, and a second electrode positioned downstream of said detecting electrode, wherein a voltage with a polarity opposite to that remaining on the dielectric lay of the recording medium is applied to said second electrode on the basis of a result of the detected electric potential.

8. A device according to claim 1, wherein said second charge-removing electrode assembly has a first electrode to which is applied a voltage having a polarity opposite to that remaining on the surface of the dielectric layer of the recording medium positioned upstream of the direction in which the recording medium is moved, and a second electrode for detecting the electric potential remaining on the recording medium, said second electrode being positioned downstream of said first electrode.

9. A device for removing a charge from a recording medium used for forming a toner image in an image forming apparatus, the recording medium having an electrically-conductive layer and a dielectric layer, said device comprising:

a plurality of recording electrodes that are independent of each other, the recording medium being movable and facing said plurality of recording electrodes;

magnetic field generating means for supplying a magnetic toner between the plurality of recording electrodes and the recording medium;

a first charge-removing electrode assembly in contact with the electrically-conductive layer of the recording medium;

means for applying a voltage with a polarity the same as that of a charge remaining on a surface of the dielectric layer of the recording medium to said first charge-removing electrode assembly;

a second charge-removing electrode assembly which is in contact with the dielectric layer of the recording medium and is positioned on a side of the recording medium; and means for applying a voltage with a polarity opposite to that of the charge remaining on the surface of the dielectric layer of the recording medium to said second charge-removing electrode assembly, wherein the magnitudes of the voltages applied to the first and second electrode assemblies are determined so that the charge within said recording medium is removed after the toner image has been utilized.

10. A device according to claim 9, wherein said second charge-removing electrode assembly comprises a brush and serves to remove residual toner.

11. A device according to claim 9, wherein said second charge-removing electrode assembly comprises a roller and serves to remove residual toner.

12. A device according to claim 9, further comprising means for detecting an electric potential remaining on the dielectric layer of the recording medium, wherein the voltage to be applied to said second charge-removing electrode assembly is determined on the basis of a result of the detected potential.

13. A device according to claim 12, wherein said second charge-removing electrode assembly comprises a first electrode for detecting an electric potential remaining on the dielectric layer of the recording medium positioned upstream of a direction in which the recording medium is moved, and a second electrode positioned downstream of a detecting electrode, wherein a voltage with a polarity opposite to that remaining on the dielectric layer of the recording medium is applied to said second electrode based on a result of the detected electric potential.

14. A device according to claim 12, wherein said second charge-removing electrode assembly comprises a first electrode to which is applied a voltage with a polarity opposite to that remaining on the surface of the dielectric layer of the recording medium positioned upstream of the direction in which the recording medium is moved, and a second electrode for detecting the electric potential remaining on the recording medium, said second electrode being positioned downstream of said first electrode.

15. A device according to claim 9, wherein said second charge-removing electrode assembly comprises a first electrode for detecting an electric potential remaining on the dielectric layer of the recording medium positioned upstream of a direction in which the recording medium is moved, and a second electrode positioned downstream of said detecting electrode, wherein a voltage with a polarity opposite to that remaining on the dielectric lay of the recording medium is applied to the second electrode based on a result of the detected electric potential.

16. A device according to claim 9, wherein said second charge-removing electrode assembly comprises a first electrode to which is applied a voltage with a polarity opposite to that remaining on the surface of the dielectric layer of the recording medium positioned upstream of the direction in which the recording medium is moved, and a second electrode for detecting the electric potential remaining on the recording medium, said second electrode being positioned downstream of said first electrode.

17. A device according to claim 9, wherein the toner image formed on the recording medium is supplied for display purposes.

18. A device according to claim 9, wherein said plurality of recording electrodes are arranged to be substantially perpendicular to a direction in which the recording medium is moved on a non-magnetic cylindrical body.

* * * * *

UNITED STATES PATENT AND TRADEMARK OFFICE

CERTIFICATE OF CORRECTION

PATENT NO. : 5,258,782

DATED : November 2, 1993

INVENTOR(S) : Toshihiko OCHIAI

It is certified that error appears in the above-identified patent and that said Letters Patent is hereby corrected as shown below:

On the title page:

Item: [56] References Cited, U.S. PATENT DOCUMENTS
"Managal et al." should read --Mangal et al.--.

Column 3
Line 52, "FIG. is" should read --FIG. 6 is--.

Column 6
Line 19, "An" should read --A--.

Column 7
Line 61, "offset" should read --offset.--.

Column 9
Line 24, "lay" should read --layer--.

Column 10
Line 44, "lay" should read --layer--.

Signed and Sealed this

Seventh Day of June, 1994

Attest:

BRUCE LEHMAN

*Attesting Officer*

*Commissioner of Patents and Trademarks*